UNITED STATES PATENT OFFICE.

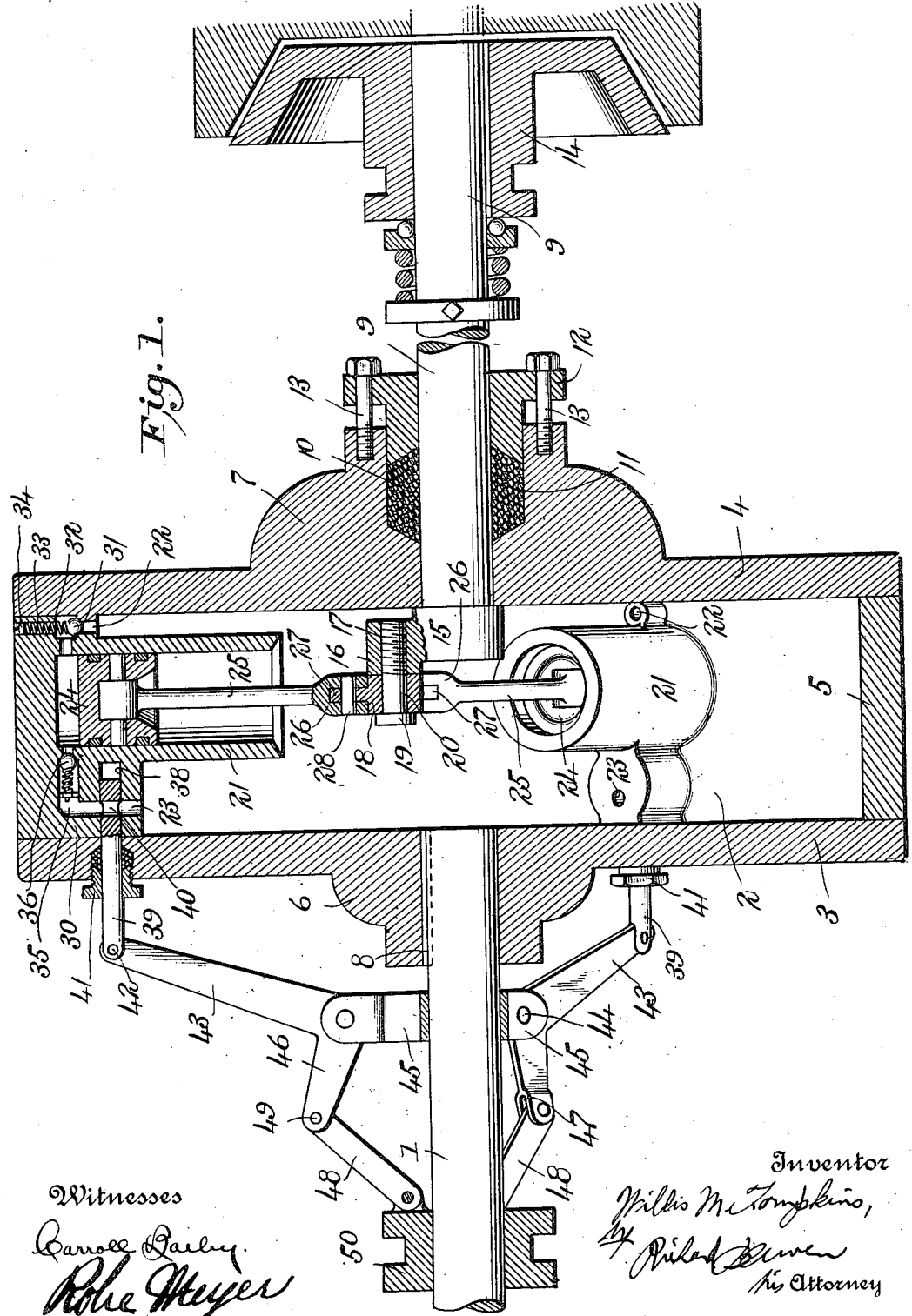

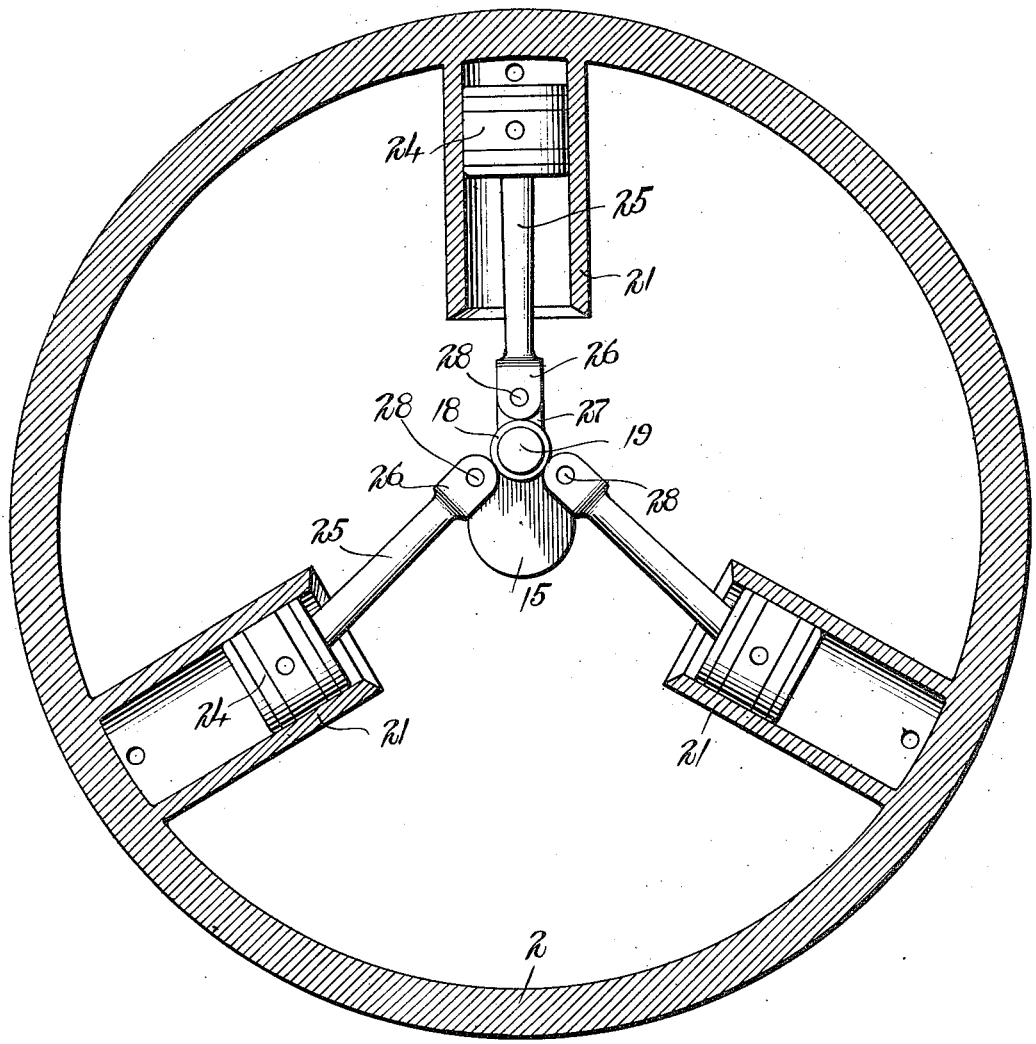

WILLIS M. TOMPKINS, OF LONOAK, CALIFORNIA.

TRANSMISSION MECHANISM.

1,173,622.   Specification of Letters Patent.   Patented Feb. 29, 1916.

Application filed November 14, 1913. Serial No. 801,079.

*To all whom it may concern:*

Be it known that I, WILLIS M. TOMPKINS, a citizen of the United States, residing at Lonoak, in the county of Monterey and State of California, have invented certain new and useful Improvements in Transmission Mechanism, of which the following is a specification.

My invention relates to transmission mechanism and more particularly to an improved fluid clutch transmission mechanism of a construction, combination and arrangement of parts to be hereinafter more particularly described and claimed.

In describing my invention in detail reference will be had to the accompanying drawings wherein like characters denote like or corresponding parts throughout the several views, and in which:—

Figure 1 is a longitudinal view through the hydraulic speed-controlling means and; Fig. 2 is a cross-sectional view through the hydraulic speed-controlling means.

In referring more particularly to the drawings, the numeral 1 designates the driven or transmission shaft which passes from the speed-controlling means to the rear axle (not shown) of the vehicle and imparts the necessary motion to the latter for the propulsion of the vehicle.

In Fig. 1 of the drawings a casing 2 which is composed of the sides 3 and 4 and the outer circumvallating side 5, is shown. The sides 3 and 4 have bearings 6 and 7 formed thereupon. The bearing 6 which is formed upon the side 3 of the casing 2 receives the inner end of the shaft 1 which is rigidly seated in the bearing by means of a longitudinal key 8. The bearing 7 which is formed upon the side 4 of the casing 2 has the power shaft 9 rotatably mounted therein and a stuffing box 10 formed about the shaft 9 as is clearly shown in Fig. 1 of the drawings. The lubricating material 10 is held in place by the ordinary type of stuffing washer 12 and the bolts 13. The shaft 9 extends forwardly of the vehicle and has the ordinary clutch mechanism 14 mounted thereupon. One end of the power shaft 9 passes through the bearing 7 and enters the interior of the casing 2, having a head portion 15 formed upon the inner end thereof to prevent longitudinal movement of the shaft 9. The head 15 has a projection 16 formed integral therewith and eccentrically disposed in relation to the shaft 9. The projection 16 is provided with a screw-threaded aperture 17 extending longitudinally therethrough and a cam 18 is connected to the projection 17 by means of a bolt 19 which passes through an opening 20 formed in the collar 18 and enters the screw-threaded aperture 17. Secured to the casing 2 and disposed equidistant thereupon is a plurality of cylinders 21 which have inlet ports 22 and outlet ports 23 communicating therewith. Pistons 24 are slidably disposed within each of the cylinders 21 and are connected to the collar 18 by means of the connecting rods 25, which connecting rods have their lower ends bifurcated as at 26. The bifurcated ends 26 of the connecting rods 25 have mounted between the bifurcations thereof tongues 27 which are formed integral with the collar 18. The bifurcated ends 26 of the connecting rods 25 are securely connected to the tongues 27 by means of pins 28 which are inserted through the arms of the bifurcated ends and the tongues 27.

The inlet ports 22 extend upwardly into the projections 30 which are formed upon the casing 2 and also integral with the cylinders 21 and enter the interior of the cylinders 21 at right angles to the longitudinal lines thereof as is clearly illustrated in Fig. 1 of the drawings. The inlet ports 22 are controlled by balls 31 which are mounted therein and have expanding coil springs 32 engaging the balls 31 and seated in recesses 33. The tension of the springs 32 is regulated by screw-threaded taps 34 which are also seated in the recesses 33 and against which one end of the springs 32 abut. The outlet ports 23 also enter the chamber contained within the cylinders 21 at right angles to the longitudinal lines thereof and curve downwardly at 35, extending through the projections 30 parallel with the sides of the casing 2 and the cylinders 21. A ball valve 36 is mounted within the outlet ports 23 and controls the same.

The projections 30 are provided with recesses 38 formed therein in which are slidably mounted members 39. The members 39 have openings 40 extending therethrough near the inner ends thereof, which openings are of practically the same diameter as the outlet ports 23 and which coincide with the outlet ports 23 when the mechanism is in a position as is shown in Fig. 1 of the drawings. The members 39 extend through openings in the side 3 of the casing 2 and have stuffing boxes 41 of the ordinary type disposed thereabout. The outer ends of the members 39 are pivotally connected at 42 to angle arms 43. The angle arms 43 are in turn pivotally connected at 44 to brackets 45 which are carried by the power shaft 1. The outer ends of the arms 46 of the angle arms 43 are bifurcated as is shown at 47 and have links 48 pivotally connected thereto by means of pins 49. The links 48 are in turn pivotally connected to a collar 50 which is slidably mounted upon the shaft 1.

When rotary motion is imparted to the shaft 9 by any suitable source of power such as the engine of the motor vehicle the pistons 24 will be caused to reciprocate within the cylinders 21 owing to the fact that they are eccentrically connected to the shaft 9 by means of the collars 18 and the projections 17. The downward stroke of the reciprocatory movement of the pistons 24 within the cylinders 21 will by the force of the suction generated thereby draw the liquid, such as lubricating oil or the like with which the casing 2 is filled up through the inlets 22 into the interior of the cylinders 21. The upward stroke of the pistons 24 will force the oil or liquid out of the interior of the cylinders 21 through the outlet ports 23 and into the interior of the casing 2. When the members 39 are held in the position which is shown in Fig. 1 of the drawings the power shaft 1 will be prevented from rotating with the shaft 9 in that the oil will be pumped or forced into the cylinders and out through the outlet ports. When the outlet ports are partially closed the shaft 9 has to make several revolutions to cause the shaft to revolve once, but when the outlet ports 23 are entirely closed the shaft 1 revolves in unison with the shaft 9 as the liquid contained within the casing 2 will not permit the shaft 9 to revolve without turning the shaft 1 in accordance therewith.

From the foregoing description and the drawings, it will be readily seen that any speed may be obtained by the propelling of the outlet ports 23 by means of the members 39. This throttling of the outlet ports 23 is occasioned by the sliding of the collar 50 upon the shaft 1 which will in turn slide or move the members 39 in the recesses 38 and greatly decrease the opening between the two sections of the outlet ports 23 which is controlled by the openings 40 in the members 39.

In practical fields, certain minor features of construction, combination and arrangement of parts may necessitate alterations to which the patentee is entitled, provided such alterations are comprehended within the scope of what is claimed.

What is claimed is:—

In transmission mechanism for motor vehicles, a power shaft, a rotatable liquid-containing casing into which said power shaft extends, radially arranged cylinders interiorly of said casing for movement therewith, a crank extension formed upon said power shaft, a piston for each cylinder, a connection between each piston and said crank extension, enlargements formed upon the outside of each cylinder at substantially diametrically opposite points, one of said enlargements being provided with an outlet passage way open to said casing and to said cylinder and the other of said enlargements being provided with an inlet passage way open to said casing and to said cylinder, a spring pressed valve operable in each passage way for the purpose specified, a driven shaft rotatable with said casing, and a means to vary the size of said outlet passage way to increase or decrease the rotating speed of said casing by regulating the flow of the liquid through said passage ways under action of the reciprocating piston.

In testimony whereof I affix my signature in presence of two witnesses.

WILLIS M. TOMPKINS.

Witnesses:
H. E. WETZEL,
R. C. FALKENBERG.